_United States Patent Office_

3,634,319
Patented Jan. 11, 1972

3,634,319
HIGH MOLECULAR WEIGHT POLYAMIDES
Michael Edward Harrison and David Charles Jones, Pontypool, England, assignors to Imperial Chemical Industries Limited, London, England
No Drawing. Filed Apr. 25, 1969, Ser. No. 819,439
Int. Cl. C08g 51/56
U.S. Cl. 260—45.75 R                4 Claims

ABSTRACT OF THE DISCLOSURE

Improved high molecular weight fibre-forming polyamides prepared using defined hydrogen phosphates as polymerisation accelerators.

---

The present invention relates to the production of high molecular weight fibre-forming synthetic linear polyamides or co-polyamides and particularly but not limitatively to such polymers having improved heat strength retention.

The use of soluble hydrogen phosphates, for instance sodium hydrogen phosphates, as polymerisation accelerating additives for obtaining polyamides with a high degree of polymerisation, is already known. Such polymers are characterised, for instance, by high molecular weight and relative viscosity and from them yarns having high strength as evinced for instance by tenacity, such as tire yarns, may be produced.

It has been found in practice, however, that although the addition of such soluble hydrogen phosphates to the polymerisation mixture does produce polymer having a high degree of polymerisation, these compounds present a serious disadvantage when incorporated in yarn made from such polymer. Due, it is believed, to migration of ions to the yarn surface, exacerbated by water and heat, said surface acquires undesirable frictional characteristics, resulting in an undesirably high level of breaks when said yarn is drawn.

Applicants have now found that if the hydrogen phosphate radical is added in the form of substantially insoluble hydrogen phosphates, such as copper dihydrogen phosphate, the polymerisation accelerating effect is, quite surprisingly, at least retained, and in some cases enhanced, while the adverse effect on drawing performance is substantially reduced. Such a system is particularly effective in the presence of low amounts of water.

The term "substantially insoluble" as applied to the hydrogen phosphates used in the present invention is defined by means of the following solubility test. Said hydrogen phosphates are incorporated into substantially phosphorus-free nylon 6.6 polymer in such amount as to give between 30 and 60 parts of phosphorus per million parts of polymer, by weight. Said polymer is then spun at 625 ft./min. and drawn at a ratio of 5.0 to give 120 denier, 20 filament yarn. 5 grams of said yarn are immersed in 150 ml. of distilled water at 25° C. for ½ hr. without stirring. The amount of phosphorus in the yarn is measured before and after immersion and the amount of phosphorus retained in the yarn is expressed as a percentage of the original amount present. If the percentage phosphorus retained is 90% or above the compound is defined herein as a substantially insoluble hydrogen phosphate. Examples of the relationship between phosphorus retention, as measured in the way described above, and the drawing performance of the yarn is shown in the table in the examples hereinafter.

The present invention, therefore, in one of its aspects provides a polyamide or copolyamide to which there has been added a substantially insoluble hydrogen phosphate as defined hereinbefore.

In another aspect the present invention provides improved articles, and particularly melt-extruded articles, such as yarns, cords, films and the like prepared from such a polyamide or copolyamide.

In practicing the present invention the amount of phosphorus added to the polymer by the substantially insoluble hydrogen phosphates may be between 10 and 1000 parts per million parts, by weight, of polymer. Preferably said amount of phosphorus lies between 20 and 150 parts per million parts of polymer.

In some cases the substantially pure hydrogen phosphate itself should be added to the polymerisation mixture. If stoichiometric amounts of, say, copper acetate and sodium hydrogen phosphate are added, the polymerisation accelerating effect is certainly produced but the drawing performance may be poor. Addition of stoichiometric amounts of magnesium acetate and sodium hydrogen phosphate, on the other hand, does not give rise to poor drawing performance.

An advantage of using a copper salt for the practicing of the present invention is that copper exerts a notable effect in reducing yarn degradation on heating, for instance oxidative degradation or gel formation, particularly when it is associated with iodine or an alkal imetal iodide. Copper monohydrogen phosphate and copper dihydrogen phosphate may be used in the practicing of the present invention.

Using the compositions of the present invention low levels of both copper and iodine can be used to produce a markedly better stabilising effect to heat and oxygen than is obtained using conventional systems employing, for instance, soluble copper acetate and potassium iodide, while at the same time exerting a surprisingly high polymerisation accelerating effect combined with substantial reduction in the adverse effect on drawing performance.

The substantially insoluble hydrogen phosphates should be prepared in such a way as to have a small and uniform particle size. Large particles may cause blockage of filtering devices during melt-spinning or, if they get into the spun yarn, they may cause breaks when the yarn is drawn. If prepared separately, not by addition of stoichiometric amounts of relevant salts to the polymerisation mixture the compounds may be ground and graded, for instance, by centrifuging. Hydrogen phosphates prepared separately should be washed thoroughly to reduce the free soluble ion content to as low a level as possible.

The degree of polymerisation acceleration and hence the rise in molecular weight will obviously depend on the nature of the polymer, its degree of polymerisation when the additives are incorporated and on the conditions, temperature and time of interreaction between the additives and the polymer or polymer forming materials. Hence, in some cases it is advisable to add the substantially insoluble phosphate, in the form of a slurry, to the monomers, while in others it is best to add it to the finished polymer, e.g. by coating onto polymer chip prior to melting and extruding. In other cases stoichiometric amounts of the phosphate forming salts may be added to the monomer solution, either separately or together, as is convenient.

In the case of a continuous polymerisation process the substantially insoluble phosphate may be added, as a slurry, to the entrant monomer solution or at any convenient point along the length of the polymerisation zone. Alternatively, if stoichiometric amounts of phosphate forming salts are used they may either be added at the entry to the apparatus, with the monomer solution, or one may be added at the entry and another at any suitable point along the polymerisation zone. Which method to use can easily be decided upon by experimentation by one skilled in the art. Furthermore, mixtures of different substantially insoluble hydrogen phosphates may be used if required.

Other adjuvants may be incorporated as desired in the polyamides so long as they do not adversely affect the properties of the articles produced therefrom.

A particularly advantageous use of the substantially insoluble hydrogen phosphates is to raise back to a desirably high level the R.V. of polymer to which excess basic material, such as hexamethylene diamine, has been added in order to increase the acid dyeability of said polymer.

Examples of the high molecular weight linear polyamides (which expression is to be understood as including co-polyamides) are listed below.

Polyamide polyhexamethylene sebacamide
polyhexamethylene adipamide
polyoctamethylene adipamide
polydecamethylene sebacamide
polypentamethylene sebacamide
polydodecamethylene adipamide
poly-epsilon-caprolactam
poly-omega-aminoundecanoic acid
poly-m-xylylene adipamide
polyhexamethylene isophthalamide Co-polyamides derived from the following starting materials may also be mentioned:

(1) hexamethylene diammonium adipate and epsilon-caprolactam (2) hexamethylene diammonium adipate and hexamethylene diammonium sebacate (3) hexamethylene diammonium adipate and hexamethylene diammonium isophthalate (4) hexamethylene diammonium terephthalate and dodecamethylene diammonium trephthalate (5) the salts from hexamethylene diamine, adipic acid and 1,4-diphenyl adipic acid.

The present invention will now be illustrated by the following non-limitative examples.

EXAMPLES 1–8

Various hexamethylene diammonium adipate solutions, containing sodium hydrogen phosphate or containing copper hydrogen phosphates, in amounts equivalent to approximately 60–80 parts per million of copper (Cu) on the final polymer, together with potassium iodide in amounts equivalent to up to approximately 900 parts per million of iodine on the final polymer, were heated in an autoclave to produce 6.6 nylon polymers. Similar polymers were also produced with addition of stoichiometric amounts copper acetate+sodium hydrogen phosphate. These polymers were melt spun at 695 feet per minute and drawn at a ratio of 5.0 to produce 120 denier, 20 filament yarns. The resistance of these yarns to degradation was evaluated by measuring their loss of strength after holding them at 225° C. in air for 30 mins. The final strength divided by the original strength and multiplied by 100 is called the heat strength retention (H.S.R.).

The accelerating effect of the various additives was evaluated from the rise in relative viscosity (R.V.), measured at equilibrium at 290 C. under steam at 1 atm. pressure in the conventional manner after heating for given periods of time at 240° under nitrogen.

It can be seen from the table below, showing the results from these various systems, that the copper hydrogen phosphates produced a markedly high degree of polymerisation acceleration together with high heat strength retention.

It can also be seen from the table that with almost the same levels of copper and iodine present the copper hydrogen phosphate systems gave better heat resistance than a conventional copper acetate system, while preserving good drawing performance. The copper acetate+sodium hydrogen phosphate systems, on the other hand, certainly gave good heat resistance but the drawing performance was poor.

HEAT RESISTANCE AND ACCELERATING EFFECTS OF THE COPPER PHOSPHATES IN 6.6 NYLON YARNS AND POLYMERS

| Example No. | Additive | Approx. additive concentration (p.p.m.) | | | Heat strength retention (H.S.R.) Percent strength retained after heating yarn at 225° C. in air for ½ hour | Accelerator effect R.V. after given holding times (hrs.) at 240° C. under nitrogen | | | | Drawing performance |
|---|---|---|---|---|---|---|---|---|---|---|
| | | Cu | I | P | | 0 | ½ | 1 | 1½ | |
| 1 | None | | | | 20 | 46 | 53 | 81 | 102 | Good. |
| 2 | Na₂HPO₄ | | | 40 | 20 | 58 | 73 | 315 | 560 | Poor. |
| 3 | CuHPO₄/KI | 60 | 600 | 30 | 83 | 55 | 136 | 636 | 1,665 | Good. |
| 4 | CuHPO₄/KI | 80 | 900 | 40 | 86 | 57 | 101 | 368 | 894 | Do. |
| 5 | Cu(H₂PO₄)₂/KI | 60 | 600 | 50 | 78 | 59 | 81 | 390 | | Do. |
| 6 | Cu acetate/KI | 60 | 600 | | 73 | 45 | 52 | 85 | 98 | Do. |
| 7 | Cu acetate/NaH₂PO₄/KI | 60 | 640 | 60 | 84 | | | | | Poor. |
| 8 | Cu acetate/Na₂HPO₄/KI | 60 | 600 | 30 | 82 | | | | | Do. |

EXAMPLES 9–17

Nylon 6.6 polymers were prepared in the conventional manner by heating monomer solutions containing the hydrogen phosphate compounds shown in the table below. Said polymers were then spun and drawn and subjected to the solubility test as described hereinbefore. The results given in the table below show that drawing performance deteriorates if the compounds are not substantially insoluble as hereinbefore defined.

| Example No. | Hydrogen phosphate | Phosphorus content of spun yarn (p.p.m.) | Percent phosphorus retained [1] | Drawing performance |
|---|---|---|---|---|
| 9 | Na₂HPO₄ | 50 | 66 | Poor. |
| 10 | CaHPO₄ | 51 | 82 | Do. |
| 11 | ZnHPO₄ | 49 | 74 | Do. |
| 12 | MgHPO₄ | 47 | 98 | Good. |
| 13 | SrHPO₄ | 39 | ≈100 | Do. |
| 14 | Ba(H₂PO₄)₂ | 48 | ≈100 | Do. |
| 15 | BaHPO₄ | 56 | 94 | Do. |
| 16 | CuHPO₄ | 30 | 90 | Fairly good. |
| 17 | Cu(H₂PO₄)₂ | 36 | 92 | Fair. |

[1] After standing in distilled water for half an hour at 25° C.

EXAMPLES 18–25

Polymers were prepared as in Examples 9–17. They were then further heated for ½ hr. at 240° C. under one atmosphere of nitrogen. The R.V. measured at equilibrium under steam at 1 atm. pressure at 290° C., was measured before and after said further heating. The table below shows that a greater R.V. increase was obtained with polymer containing substantially insoluble hydrogen phosphates of the present invention than without them. The copper and magnesium compounds gave particularly large rises.

| Example No. | Hydrogen phosphate | Phosphorus content (p.p.m.) | Equilibrium R.V.[1] | R.V. of polymer[2] |
|---|---|---|---|---|
| 18 | None added | | 46 | 53 |
| 19 | CuHPO₄ | 40 | 57 | 103 |
| 20 | Cu(H₂PO₄)₂ | 70 | 53 | 436 |
| 21 | MgHPO₄ | 70 | 55 | 166 |
| 22 | SrHPO₄ | 70 | 47 | 63 |
| 23 | Ba(H₂PO₄)₂ | 70 | 50 | 65 |
| 24 | BaHPO₄ | 70 | 50 | 67 |
| 25 | CoHPO₄ | 70 | 48 | 65 |

[1] At 290° C. under steam at one atmosphere pressure.
[2] After further polymerisation for ½ hr. at 240° C. under one atmosphere pressure of nitrogen.

EXAMPLES 26–28

Batches of 6.6 nylon polymers were prepared as in the previous examples. The polymers contained either no phosphate, magnesium hydrogen phosphate or sodium hydrogen phosphate, at levels equivalent to 75 parts per million of phosphorus on the final polymer. 300 lb. batches of these polymers were then melt spun at 1,115 ft./min. and drawn at 5.26 draw ratio to produce high tenacity tire cord yarn of 840 denier and 140 filaments. The table below shows that the polymer containing water-extractable $NaH_2PO_4$ had a completely unacceptable number of breaks at drawing. Yarn containing substantially insoluble $MgHPO_4 3H_2O$ had a break rate equivalent to phosphate-free yarn. However, even with the short time (approximately 5 mins.) that the polymers were held in the melt pool it can be seen that the magnesium salt brought about a noticeable increase in relative viscosity and tenacity (measured in grams tension per drawn-yarn denier, at break) as compared with the figures for yarn containing no phosphate.

| Example No. | Phosphate added | Phosphorus content (p.p.m.) | Number of yarn breaks per 100 lb. on drawing | Yarn R.V. | Yarn tenacity (g./d.) |
|---|---|---|---|---|---|
| 26 | None | | 1.4 | 48.0 | 8.33 |
| 27 | $MgHPO_4 3H_2O$ | 75 | 0.7 | 51.4 | 8.73 |
| 28 | $NaH_2PO_4$ | 75 | >100 | 51. | 7.80 |

EXAMPLE 29

Two batches of 6.6 nylon polymer were prepared in the conventional manner, with excess hexamethylene diamine. The final $TiO_2$ content of the polymer was 0.2%. The first batch contained no phosphate and the second contained magnesium hydrogen phosphate at a level equivalent to 90 parts per million of phosphorus on the final polymer. The amount of excess hexamethylene diamine added in each case was such as to give polymers with relative viscosities of approximately 40 (i.e. 0.5 mole percent excess HMD with no phosphate and 1.2 mole percent excess with the magnesium salt present) (relative viscosity measured using an 8.4% (w./w.) solution of 6.6 nylon in 90% formic acid solution). These polymers were melt spun and then drawn at a draw ratio of 3.71 to produce yarns of 260 denier and 17 filaments. The drawing of the phosphate-containing yarn was as good as the phosphate-free yarn. Equilibrium dye uptake at pH8 using acid dyes was very much improved in the case of the phosphate-containing yarn since there was a much higher excess HMD with preservation of approximately the same R.V.

What I claim is:
1. A high molecular weight fiber-forming polyamide polymer wherein phosphorus in the form of a hydrogen phosphate of a metal selected from the group consisting of magnesium, strontium, barium, copper and cobalt which phosphate constitutes between 10 and 1000 parts per million parts by weight of the polymer, said hydrogen phosphate being a phosphate which when incorporated in hexamethylene adipamide yarn is substantially insoluble in water.

2. The polymer of claim 1 wherein said hydrogen phosphate is magnesium hydrogen phosphate or copper hydrogen phosphate.

3. The polymer of claim 1 wherein said polyamide is polyhexamethylene adipamide.

4. The polymer of claim 1 wherein said polyamide is a copolyamide derived from 2 or more different polyamide-forming monomer precursors.

References Cited
UNITED STATES PATENTS 2,630,421   3/1953   Stamatoff _____ 260—45.7
2,705,227   3/1955   Stamatoff _____ 260—45.7

DONALD E. CZAJA, Primary Examiner

V. P. HOKE, Assistant Examiner

U.S. Cl. X.R.

260—45.7 P, 45.75 C